United States Patent
Koroly et al.

(10) Patent No.: US 12,297,571 B2
(45) Date of Patent: May 13, 2025

(54) SYSTEMS AND METHODS FOR SPRAY CLEANING NEEDLES FOR THROUGH THICKNESS REINFORCEMENT OF RESIN-INFUSED FABRICS

(71) Applicant: Rohr, Inc., Chula Vista, CA (US)

(72) Inventors: Christopher C. Koroly, Spring Valley, CA (US); Katherine E. Waugh, San Diego, CA (US); Vijay V. Pujar, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/165,238

(22) Filed: Feb. 6, 2023

(65) Prior Publication Data
US 2024/0141572 A1 May 2, 2024

Related U.S. Application Data

(60) Provisional application No. 63/421,096, filed on Oct. 31, 2022.

(51) Int. Cl.
*D04H 18/02* (2012.01)
*B08B 3/02* (2006.01)
(Continued)

(52) U.S. Cl.
CPC ............. *D04H 18/02* (2013.01); *B08B 3/022* (2013.01); *B08B 5/023* (2013.01); *B25J 15/04* (2013.01)

(58) Field of Classification Search
CPC .......... D04H 18/02; D04H 18/00; D04H 1/46; D04H 3/102; D04H 3/105; D04H 5/02;
(Continued)

(56) References Cited

U.S. PATENT DOCUMENTS

| | | | |
|---|---|---|---|
| 1,686,439 A * | 10/1928 | Cooke | D05B 83/00 112/281 |
| 2,601,432 A | 6/1952 | Clements | |

(Continued)

FOREIGN PATENT DOCUMENTS

| | | |
|---|---|---|
| CN | 105755679 | 7/2016 |
| CN | 108103671 | 6/2018 |

(Continued)

OTHER PUBLICATIONS

European Patent Office, European Search Report dated Jul. 8, 2024 in Application No. 23204626.8.

(Continued)

*Primary Examiner* — Amy Vanatta
(74) *Attorney, Agent, or Firm* — SNELL & WILMER L.L.P.

(57) ABSTRACT

An end effector for the through thickness reinforcement of a fibrous preform includes a plurality of spray nozzles configured to direct a needle cleaning fluid to a needle to clean resin from the needle between through thickness reinforcement operations. The plurality of spray nozzles may extend from a presser foot toward the needle. The needle cleaning fluid may contact the needle while the needle or the presser foot move (e.g., translate and/or rotate) with respect to the other of the needle or the presser foot. The plurality of spray nozzles can be incorporated into the end effector. The plurality of spray nozzles can be incorporated into a needle cleaning station into which a portion of the robotic end effector can be moved for cleaning the needles.

14 Claims, 14 Drawing Sheets

(51) Int. Cl.
B08B 5/02 (2006.01)
B25J 15/04 (2006.01)

(58) Field of Classification Search
CPC .... D04H 13/005; D04H 1/4242; D04H 1/498; B08B 3/02; B08B 3/022; B08B 3/024; B08B 5/02; B08B 5/023; C04B 35/83; C04B 2235/5248; B25J 15/04; D05B 71/04
USPC .............................. 28/107–115; 112/281, 282
See application file for complete search history.

(56) References Cited

U.S. PATENT DOCUMENTS

| | | | |
|---|---|---|---|
| 2,690,149 A * | 9/1954 | Adams | D05B 71/04 112/281 |
| 2,896,303 A | 7/1959 | Morrill | |
| 3,022,813 A | 2/1962 | Glover | |
| 3,605,223 A | 9/1971 | Barth | |
| 3,611,958 A * | 10/1971 | Rutledge | D05B 71/04 112/281 |
| 3,729,785 A | 5/1973 | Sommer | |
| 3,889,326 A | 6/1975 | Tyas | |
| 3,910,210 A * | 10/1975 | Marforio | D05B 71/04 112/281 |
| 3,916,494 A | 11/1975 | Konig | |
| 4,305,339 A * | 12/1981 | Inglis | D05B 71/04 112/281 |
| 4,353,158 A | 10/1982 | Henshaw | |
| 4,369,723 A * | 1/1983 | Griffith, Jr. | D05B 71/04 112/281 |
| 4,777,706 A | 10/1988 | Stanislaw | |
| 5,016,331 A | 5/1991 | Dilo | |
| 5,125,135 A | 6/1992 | Kalteis | |
| 5,226,217 A | 7/1993 | Olry et al. | |
| 5,511,294 A | 4/1996 | Fehrer | |
| 5,513,423 A | 5/1996 | Jakob | |
| 5,515,798 A | 5/1996 | Cahuzac | |
| 5,699,595 A * | 12/1997 | Feyerl | D04H 1/46 28/107 |
| 5,800,672 A | 9/1998 | Boyce et al. | |
| 5,894,643 A | 4/1999 | Fehrer | |
| 5,896,633 A * | 4/1999 | Fehrer | D04H 18/02 28/103 |
| 6,161,269 A | 12/2000 | Dilo | |
| 6,233,797 B1 | 5/2001 | Neely | |
| 6,405,417 B1 | 6/2002 | Sheehan et al. | |
| 6,735,837 B2 | 5/2004 | Pum | |
| 7,296,525 B2 * | 11/2007 | Cho | D05B 71/04 112/281 |
| 7,497,001 B2 | 3/2009 | Hall et al. | |
| 8,192,662 B2 | 6/2012 | Asahara et al. | |
| 9,193,113 B2 | 11/2015 | La Forest et al. | |
| 10,448,706 B2 | 10/2019 | Ho | |
| 11,491,745 B2 | 11/2022 | Kim et al. | |
| 2003/0136502 A1 | 7/2003 | Lavasserie et al. | |
| 2013/0255047 A1 | 10/2013 | Sasur | |
| 2013/0255556 A1 * | 10/2013 | Hasegawa | D05B 69/30 112/284 |
| 2015/0152582 A1 * | 6/2015 | Takizawa | D05B 55/02 112/225 |
| 2018/0103724 A1 | 4/2018 | Ho | |
| 2020/0354870 A1 | 11/2020 | Groelz | |
| 2022/0184880 A1 | 6/2022 | Barnes et al. | |
| 2023/0295849 A1 | 9/2023 | Deng | |

FOREIGN PATENT DOCUMENTS

| | | | |
|---|---|---|---|
| CN | 108789447 | 11/2018 | |
| CN | 11021909 | 9/2019 | |
| CN | 110219097 | 9/2019 | |
| CN | 20977916 | 12/2019 | |
| CN | 209779164 | 12/2019 | |
| CN | 112318499 | 2/2021 | |
| CN | 114474958 | 5/2022 | |
| CN | 114703605 | 7/2022 | |
| DE | 202013105848 | 3/2015 | |
| EP | 1384804 A1 * | 1/2004 | ............. D04H 18/02 |
| EP | 1384804 | 10/2007 | |
| EP | 4144904 A1 * | 3/2023 | ............. D04H 18/02 |
| FR | 2794138 | 12/2000 | |
| GB | 2310221 A * | 8/1997 | ............. D04H 18/02 |

OTHER PUBLICATIONS

European Patent Office, European Search Report dated Feb. 16, 2024 in Application No. 23204703.5.
European Patent Office, European Search Report dated Feb. 16, 2024 in Application No. 23204191.3.
European Patent Office, European Partial Search Report dated Apr. 16, 2024 in Application No. 23204626.8.
USPTO; Requirement for Restriction dated Mar. 28, 2024 in U.S. Appl. No. 17/978,104.
USPTO; Requirement for Restriction dated Apr. 18, 2024 in U.S. Appl. No. 18/165,271.
USPTO; Non-Final Office Action dated Aug. 15, 2024 in U.S. Appl. No. 17/978,104.
USPTO; Non-Final Office Action dated Sep. 5, 2024 in U.S. Appl. No. 18/165,271.

* cited by examiner

SYSTEMS AND METHODS FOR SPRAY CLEANING NEEDLES FOR THROUGH THICKNESS REINFORCEMENT OF RESIN-INFUSED FABRICS

CROSS REFERENCE TO RELATED APPLICATIONS

This application claims priority to, and the benefit of, U.S. Provisional Patent Application Ser. No. 63/421,096, entitled "SYSTEMS AND METHODS FOR SELF-CLEANING NEEDLES FOR THROUGH THICKNESS REINFORCEMENT OF RESIN-INFUSED FABRICS," filed on Oct. 31, 2022. The '096 Application is hereby incorporated by reference in its entirety for all purposes.

FIELD

The present disclosure relates generally to the manufacture of carbon/carbon composites, and, more particularly, to cleaning of through thickness reinforcement needles.

BACKGROUND

Through thickness reinforced composites (i.e., composites with fibers inserted into the through thickness (or z-) direction of the laminate) generally provide higher interlaminar properties but lower in-plane properties compared to 2D lay-ups. One such example of through thickness reinforcement is needling, where in-plane fibers are moved to turn in the out-of-plane direction into the thickness of the preform using a needling process. Alternative through-thickness reinforcement methods include stitching, tufting, and others that are known to those skilled in the art, which insert a fiber filament (or similar) into the through thickness direction.

SUMMARY

An end effector for through thickness reinforcement of a fibrous preform is disclosed. In various embodiments, the end effector comprises a body, a presser foot mounted to the body and moveable with respect to the body, a needle mounted to the body, and a plurality of spray nozzles mounted to the presser foot, wherein the plurality of spray nozzles is configured to direct a pressurized cleaning fluid toward the needle for cleaning the needle.

In various embodiments, the needle extends through the presser foot. The plurality of spray nozzles may extend from an interior surface of the presser foot. The needle can be located adjacent to the presser foot. The plurality of spray nozzles may extend from an exterior surface of the presser foot. The needle may be configured to rotate while the plurality of spray nozzles direct the pressurized cleaning fluid toward the needle for cleaning the needle. The presser foot and the plurality of spray nozzles may be configured to rotate with respect to the needle while the plurality of spray nozzles direct the pressurized cleaning fluid toward the needle for cleaning the needle. The needle may be configured to translate with respect to the presser foot while the plurality of spray nozzles direct the pressurized cleaning fluid toward the needle for cleaning the needle.

The end effector may further comprise a first fluid feed, a second fluid feed, wherein the plurality of spray nozzles comprises a first plurality of spray nozzles and a second plurality of spray nozzles, a first valve coupled between the first fluid feed and the first plurality of spray nozzles, and a second valve coupled between the second fluid feed and the second plurality of spray nozzles. The first fluid feed may be configured to supply the first plurality of spray nozzles with a first cleaning fluid via the first valve and the second fluid feed is configured to supply the second plurality of spray nozzles with a second cleaning fluid via the second valve.

The end effector may further comprise a first fluid feed, a second fluid feed, and a valve configured to meter a flow of a first cleaning fluid from the first fluid feed to the plurality of spray nozzles and/or a flow of a second cleaning fluid from the second fluid feed to the plurality of spray nozzles.

The presser foot can be coupled to the body via a spring member.

A method for cleaning a needle operatively coupled to an end effector is disclosed. In various embodiments, the method comprises directing a needle cleaning fluid from a plurality of spray nozzles to the needle, contacting the needle with the needle cleaning fluid, and removing debris from the needle with the needle cleaning fluid.

In various embodiments, the method further comprises moving the end effector over a drip tray. In various embodiments, directing a cleaning fluid from a plurality of spray nozzles to the needle comprises directing a first cleaning fluid comprising a gas from the plurality of spray nozzles to the needle and subsequently directing a second cleaning fluid comprising a gas from the plurality of spray nozzles to the needle for drying the needle.

In various embodiments, the method further comprises translating the needle with respect to a presser foot while the needle cleaning fluid is being directed to the needle. In various embodiments, the method further comprises rotating the needle with respect to the presser foot while the needle cleaning fluid is being directed to the needle.

In various embodiments, the method further comprises performing a through thickness reinforcement process with the first end effector, moving the first end effector to a needle spray cleaning station, wherein the needle spray cleaning station directs the needle cleaning fluid from the plurality of spray nozzles to the needle to remove the debris from the needle with the needle cleaning fluid, detaching a robotic arm from the first end effector, moving the robotic arm to a clean second end effector, attaching the robotic arm to the clean second end effector, and continuing the through thickness reinforcement process with the clean second end effector while the first end effector is being cleaned by the needle spray cleaning station.

A needle cleaning station is disclosed. In various embodiments, the needle cleaning station comprises a housing defining a cavity configured to receive a needle, a plurality of spray nozzles, and a fluid feed configured to supply the plurality of spray nozzles with a cleaning fluid for cleaning the needle.

In various embodiments, the housing comprises a sealing surface configured to seal against an end effector to contain the cleaning fluid within the housing. The needle cleaning station may further comprises a nozzle support structure defining a plenum, wherein at least one spray nozzle of the plurality of spray nozzles is mounted to the nozzle support structure, and the nozzle support structure is configured to supply the at least one spray nozzle with the cleaning fluid via the plenum. The nozzle support structure may extend from a bottom surface of the housing. The needle cleaning station further comprises a negative pressure drains disposed through a bottom surface of the housing and configured for collecting the cleaning fluid.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
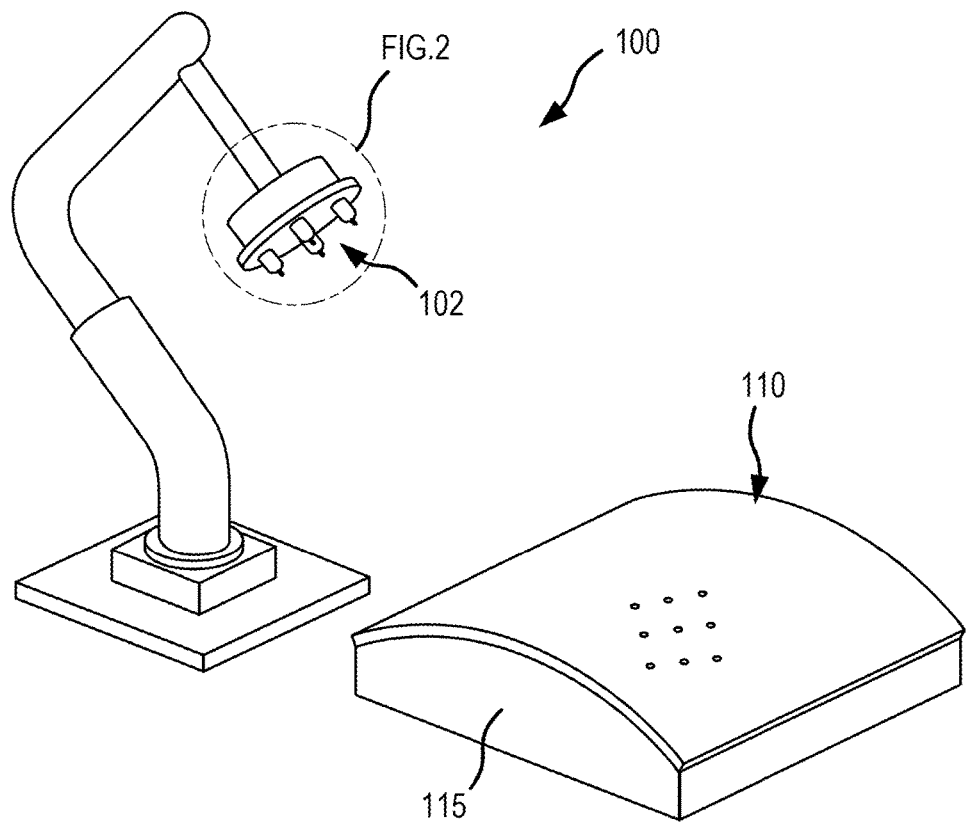
FIG. 1 is a perspective illustration of an exemplary robotic arm comprising an end effector during a through thickness reinforcement process of a fibrous preform, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

The present disclosure provides methods for cleaning needles in between punches of resin-infused fabrics, so as not to clog needle barbs or eyes. Textile needles may include small barbs to efficiently transport fibers in the through-thickness direction of the fibrous preform. In various embodiments, needles may include small eyes (in some cases in addition to small barbs) to transport a fiber filament in the through-thickness direction of the fibrous preform. If the barbs or eyes are clogged, then through thickness reinforcement (TTR) may be compromised. The premiere needle manufacturers do not recommend needling resin-infused fabrics for this reason.

In order to enable this type of through thickness reinforcement, a needle attachment is disclosed herein that may be mechanically or electrically actuated to run a needle cleaning material (e.g., bristle brushes, foam, or other) over the surface of the needle to effectively clean the needle barbs and eyes. Needle covers (also referred to herein as presser feet) may be automatically changed at specific frequencies depending on the resin content of the fabric, among other factors.

A self-cleaning needle arrangement of the present disclosure may utilize relative motion of the needle (e.g., linear and/or rotational) with respect to a needle cleaning material to clean the surface of the needle (including the barbs thereof, if so equipped) during or between through thickness reinforcement processes. A self-cleaning needle arrangement of the present disclosure enables the manufacture of thick, complex contour, fibrous preforms via the through thickness reinforcement of resin-infused fabrics. A self-cleaning needle arrangement of the present disclosure tends to reduce cost and/or cycle time by reducing the amount of needle changeover (i.e., increasing time between needle tooling maintenance). A self-cleaning needle arrangement of the present disclosure tends to enable production of components via hybrid densification (resin and gas infiltration) through the use of resin-infused fabrics laid up in a complex contour.

A needle cleaning spray system of the present disclosure may utilize spray nozzles for directed a high pressure flow of a cleaning fluid to one or more needles for cleaning debris therefrom (e.g., at predetermined intervals or when it is determined the needle barbs are clogged or nearly clogged). A needle cleaning spray system of the present disclosure may be performed while the needles are installed on a robotic arm during an automated process. For example, a drip tray may be placed near the robot and the robotic arm can be moved over the drip tray for needle spray cleaning (so as to not spray excess cleaning fluid onto the workpiece). A high pressure spray cleaning station can similarly be placed near the robotic arm for providing a stand-alone spray cleaning station for cleaning needle barbs from debris (e.g., resin) accumulated over a series of through thickness reinforcement procedures.

With reference to FIG. 1, a robotic arm 100 comprising an end effector 102 is illustrated during a through thickness reinforcement process of a fibrous preform 110, in accordance with various embodiments. Fibrous preform 110 may be placed over a tool 115 and formed to the geometry of the tool 115. In this manner, fibrous preform 110 may be shaped into a compound contour preform (e.g., bent about one or more axes). Robotic arm 100 may be configured to move the end effector 102 with respect to the fibrous preform 110 in a controlled manner to perform a through thickness reinforcement process, such as Z-needling. Z-needling refers to a process comprising penetrating a composite material (e.g., fibrous preform 110) with needles and moving (e.g., by pulling or pushing) fibers from the in-plane direction and forcing them into the Z direction, where the "Z direction" as used herein refers to a direction perpendicular to the in-plane direction. For preforms having curved surfaces, the "Z-direction" refers to the direction normal to a (local) surface of the fibrous preform at the point where the preform is being needled (i.e., a direction normal to the tangent plane to the surface at the point of needling). In general, the Z-needling process has the effect of interlocking individual fabric layers together. The same effect may also be achieved by stitching or tufting, known to those skilled in the art to comprise inserting a fiber filament into the through-thickness direction. Thus, after through thickness reinforcement, the fibrous material has fibers extending in three different directions (i.e., in the X and Y directions in the plane of the fibrous layers and the Z direction perpendicular to the fibrous layers). It should be appreciated that due to the complex contours of the fibrous preform 110, the X, Y, and Z directions may vary depending on the particular location of the fibrous preform 110.

Figure 2:
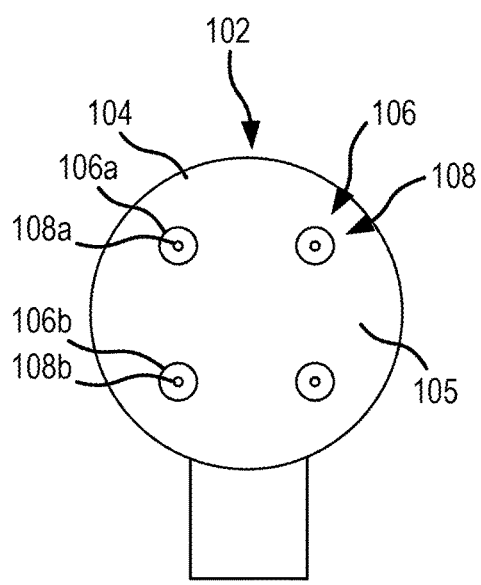
FIG. 2 is an illustration of a face of the end effector of FIG. 1, in accordance with various embodiments.

With reference to FIG. 2, a view of the face of end effector 102 is illustrated, in accordance with various embodiments. End effector 102 may comprise a head or body 104, a plurality of presser feet 106 (e.g., first presser foot 106a, second presser foot 106b, etc.), and a plurality of needles 108 (e.g., first needle 108a, second needle 108b, etc.). Body 104 may be made from a metal material, a composite material, or a plastic material. Body 104 may house various components for actuating presser feet 106 and/or needles 108. Presser feet 106 may be moveable with respect to body 104. Presser feet 106 may be moveable with respect to needles 108. Needles 108 may be moveable with respect to body 104. Needles 108 may be moveable with respect to presser feet 106. A face 105 of the body may be flat or planar. Face 105 may face the fibrous preform during the through thickness reinforcement process. In various embodiments, presser feet 106 and needles 108 extend from face 105.

In various embodiments, each presser foot 106 comprises a cylindrical body with a hemispherical-shaped end; though other presser foot 106 shapes and/or designs are contemplated herein. Each presser foot 106 may be made from a metal material, a rubber material, a composite material, and/or a plastic material. The material of presser foot 106 may be selected based on the desired pressure exerted onto fibrous preform 110, among other factors.

In various embodiments, each needle 108 may be made from a metal material, a composite material, or a plastic material. The material of needle 108 may be selected depending on the material of fibrous preform 110, among other factors.

Figure 3:
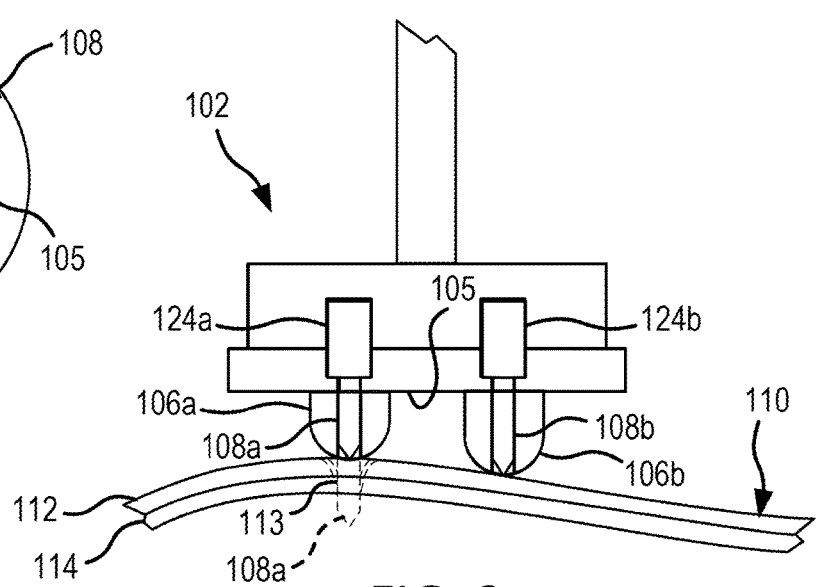
FIG. 3 is a schematic sectional illustration of the end effector during a through thickness reinforcement process, in accordance with various embodiments.

With reference to FIG. 3, end effector 102 is illustrated during a through thickness reinforcement process of fibrous preform 110. Fibrous preform 110 may comprise a first layer 112 and a second layer 114. First layer 112 may be a top layer. Each layer of material may share a common (e.g., the same) construction and/or material makeup. Each layer of material, for example, may be formed by a sheet/layer of fibrous material; e.g., woven carbon fiber, woven oxidized polyacrylonitrile (PAN) fibers, non-crimp fabric, etc. One or more or all the layers of material may each be impregnated with a polymer matrix; e.g., thermoset material or thermoplastic material. One or more or all of the layers of material may each be unimpregnated (e.g., only include the fibrous material) where, for example, the preform material is impregnated subsequent to formation of the composite structure. The method of the present disclosure, however, is not limited to such exemplary layer materials.

End effector 102 may be moved (e.g., via robotic arm 100) with respect to fibrous preform 110. With the end effector 102 in the desired position, one or more needles may be actuated to penetrate fibrous preform 110, thereby moving one or more fibers 113 from first layer 112 into second layer 114 and interlocking first layer 112 with second layer 114. For example, needle 108a is illustrated in FIG. 3 moving from a non-penetrating position to a penetrating position (also referred to herein as a retracted position (see needle 108b) and an extended position (see needle 108a), respectively). In this regard, needles 108 may be referred to herein as articulating needles. Needle 108b may be similarly operated. Needles 108a and 108b can be controlled individually or in groups by programmable robotic system (e.g., see control unit 250 of FIG. 6 through FIG. 9) to puncture the plies of fibrous preform 110 to a desired depth, at a desired angle, and/or a desired needling density (e.g., various needles 108 may be commanded not to penetrate the fibrous preform to vary a needling density (i.e., number of needles per unit area)). The needles 108a and 108b may be configured to puncture the fibers in the top ply or a sacrificial ply layer into the adjacent plies at the desired angle and depth. The end effector 102 may be rotated to appropriate angles to needle plies at different desired angles.

In various embodiments, end effector 102 further includes an actuator for each needle 108. In various embodiments, each actuator may actuate a single needle or a zone of needles (e.g., a row of needles or a column of needles in accordance with various embodiments). Needles 108 may be actuated independent of the position of the presser feet 106. In the illustrated embodiments, needles 108a and 108b comprise actuators 124a and 124b, respectively, for extending and/or retracting the respective needle 108a and 108b.

FIG. 3 illustrates presser foot 106a in a retracted position and presser foot 106b in an extended position, whereby the presser feet 106 apply a pressure to the fibrous preform 110 during the through thickness reinforcement process. Presser feet 106 may apply a desired pressure to the fibrous preform 110 to secure the fibrous preform 110 while the fibrous preform 110 is needled by needles 108. In this regard, presser feet 106 may be referred to herein as articulating presser feet.

Figures 4A, 4B:
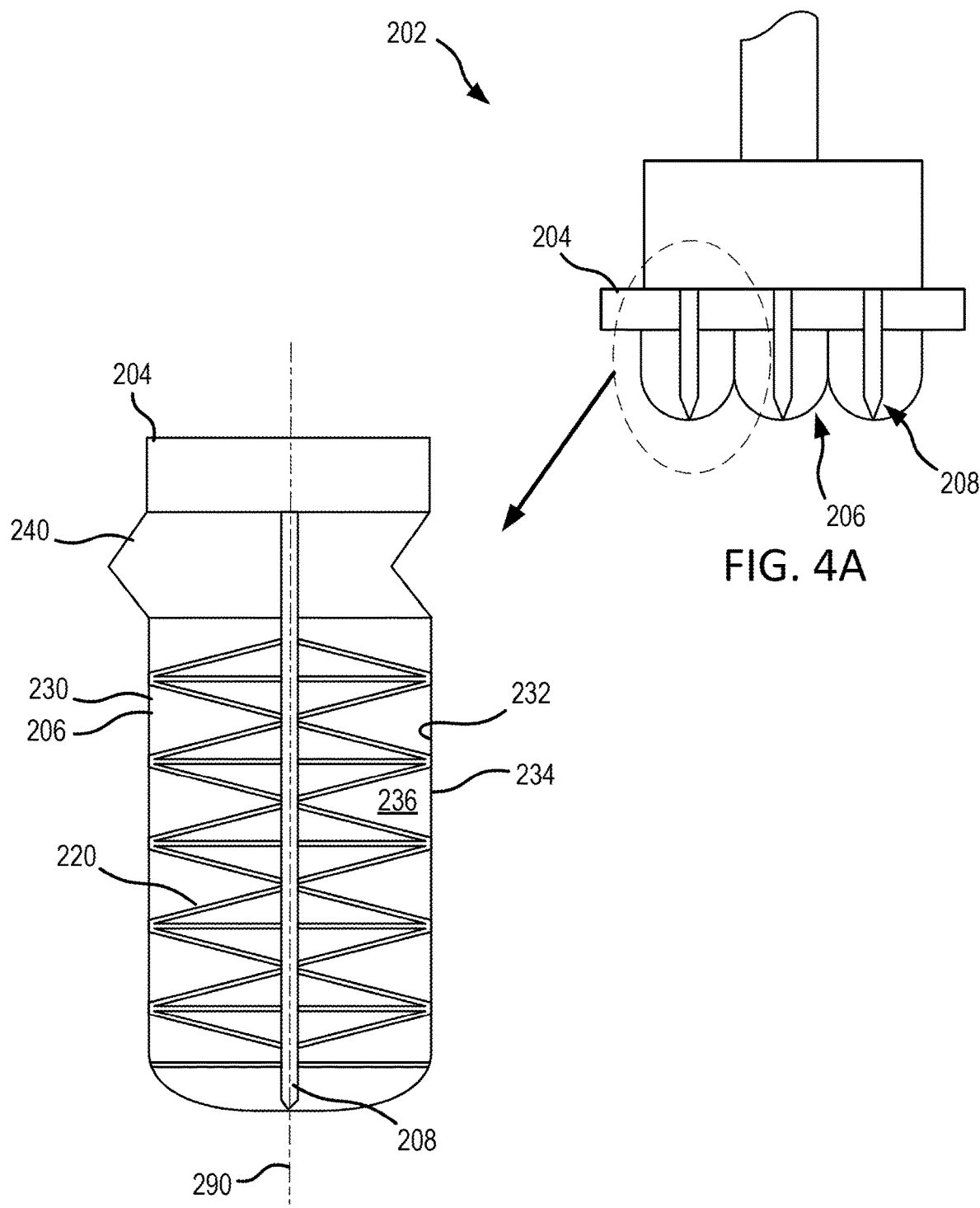
FIG. 4A is a schematic illustration of an end effector having self-cleaning needles that extend through presser feet, in accordance with various embodiments.
FIG. 4B is a detailed schematic illustration of a self-cleaning needle of the end effector of FIG. 4A, in accordance with various embodiments.

FIG. 4A illustrates an end effector 202 comprising a plurality of self-cleaning needles 208, in accordance with various embodiments. End effector 202 may be similar to end effector 102 of FIG. 1 through FIG. 3, in accordance with various embodiments. End effector 202 comprises a head or body 204, presser feet 206, and needles 208.

FIG. 4B is a detailed, schematic illustration of a presser foot 206 coupled to body 204. Presser foot 206 may comprise a generally cylindrical body 230 comprising an interior surface 232 defining a cavity 236 and an exterior surface 234. In various embodiments, needle 208 extends through presser foot 206. In various embodiments, needle 208 and presser foot 206 are coaxially aligned along central axis 290.

A needle cleaning material 220 may extend from presser foot 206 toward needle 208. Needle cleaning material 220 may be configured to contact needle 208 to clean resin from the needle 208 during and/or between through thickness reinforcement processes. In various embodiments, a needle cleaning material of the present disclosure (e.g., needle cleaning material 220) comprises a bristle brush. In various embodiments, needle cleaning material of the present disclosure may comprise bristle brushes made of synthetic or metallic materials depending on the resistance of the particular resin to be "cleaned" off the needles. Exemplary synthetic materials include nylon, PVC, polyethylene, and (poly)styrene, among others. Exemplary metallic materials include brass, bronze, stainless steel, and carbon steel, among others. The needle cleaning material may be coupled with a coating on the needle, where the coating may be selected to not be wetted by the resin. Alternatively, or in addition, the needle may have a coating to be wear-resistant to the withstand the cleaning by the needle cleaning material. In various embodiments, a needle cleaning material of the present disclosure (e.g., needle cleaning material 220) comprises a rigid foam. Polyurethane and polystyrene are two exemplary rigid foam materials. The rigid foam may completely encapsulate the needle within the presser foot to clean resin away from the needles. The rigid foam may be designed to extend far enough from the exterior reciprocating presser foot to completely encapsulate the needle to clean resin away from the needles. Needle cleaning material 220 may surround needle 208.

Needle cleaning material 220 may be configured to slidingly engaged needle 208 in response to a variety of relative movement between needle 208 and presser foot 206. In various embodiments, needle 208 may remain stationary with respect to body 204 and presser foot 206 may translate along central axis 290 between an extended position (e.g., see presser foot 106b of FIG. 3) and a retracted position (e.g., see presser foot 106a of FIG. 3). For example, presser foot 206 may be coupled to body 204 via a spring member 240. Spring member 240 may be tailored to provide a desired amount of pressure on the fibrous preform during the through thickness reinforcement process. Spring member 240 may bias presser foot 206 toward the extended position. Presser foot 206 may translate along central axis 290, against the bias of spring member 240, in response to the presser foot 206 contacting the fibrous preform. In various embodiments, spring member 434 is a coil spring. Needle cleaning material 220 may slidingly engage needle 208 in response to presser foot 206 translating between the extended position and the retracted position.

In various embodiments, presser foot 206 may remain stationary with respect to body 204 and needle 208 may translate along central axis 290 between a retracted position and an extended position (e.g., see needle 108a of FIG. 3). In this regard, needle cleaning material 220 may slidingly engage needle 208 in response to needle 208 translating between the retracted position and the extended position (e.g., during or between through thickness reinforcement processes).

Figure 5A:
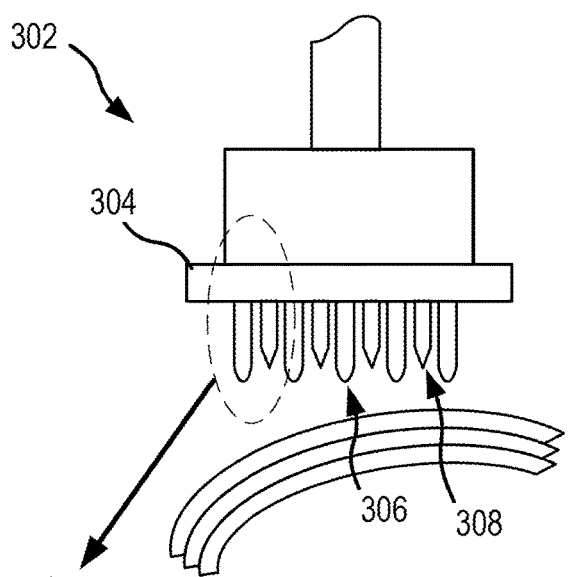
FIG. 5A is a schematic illustration of an end effector having self-cleaning needles disposed adjacent to presser feet, in accordance with various embodiments.

FIG. 5A illustrates an end effector 302 comprising a plurality of self-cleaning needles 308, in accordance with various embodiments. End effector 302 may be similar to end effector 102 of FIG. 1 through FIG. 3, in accordance with various embodiments. End effector 302 comprises a head or body 304, presser feet 306, and needles 308.

Figure 5B:
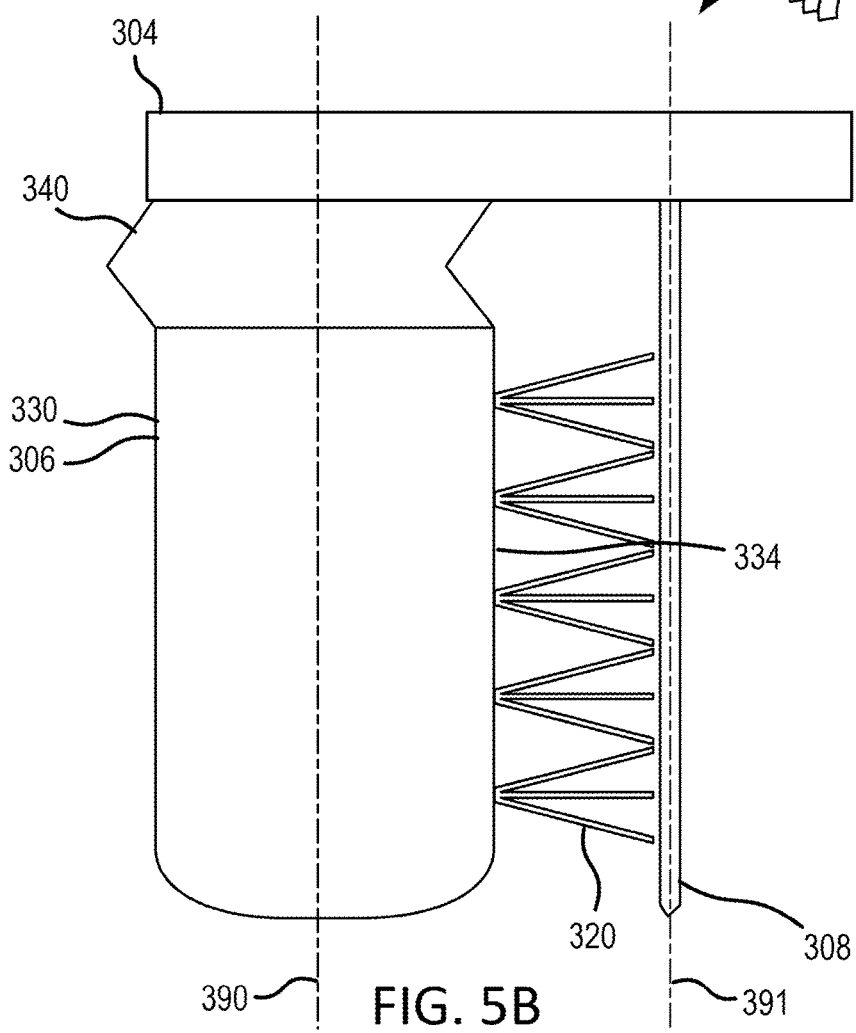
FIG. 5B is a detailed schematic illustration of a self-cleaning needle of the end effector of FIG. 5A, in accordance with various embodiments.

FIG. 5B is a detailed, schematic illustration of a presser foot 306 coupled to body 304. Presser foot 306 may comprise a generally cylindrical body 330 comprising an exterior surface 334. In various embodiments, needle 308 is disposed adjacent to presser foot 306. Presser foot 306 may define a central axis 390. Needle 308 may define a central axis 391.

A needle cleaning material 320 may extend from presser foot 306 toward needle 308. Needle cleaning material 320 may be configured to contact needle 308 to clean resin from the needle 308 during and/or between through thickness reinforcement processes. Needle cleaning material 320 may be configured to slidingly engaged needle 208 in response to a variety of relative movement between needle 308 and presser foot 306. In various embodiments, needle 308 may remain stationary with respect to body 304 and presser foot 306 may translate along central axis 390 between an extended position (e.g., see presser foot 106b of FIG. 3) and a retracted position (e.g., see presser foot 106a of FIG. 3). For example, presser foot 306 may be coupled to body 304 via a spring member 340. Needle cleaning material 320 may slidingly engage needle 308 in response to presser foot 306 translating between the extended position and the retracted position. In various embodiments, presser foot 306 may remain stationary with respect to body 304 and needle 308 may translate along central axis 391 between a retracted position and an extended position (e.g., see needle 108a of FIG. 3). In this regard, needle cleaning material 320 may slidingly engage needle 308 in response to needle 308 translating between the retracted position and the extended position (e.g., during or between through thickness reinforcement processes). In various embodiments, needle cleaning material 320 cleans only a portion of needle 308 (e.g., one fourth or one half of a circumference) and other adjacent needle cleaning materials (similarly situated adjacent to needle 308) clean the other portion(s) of needle 308.

Figure 6:
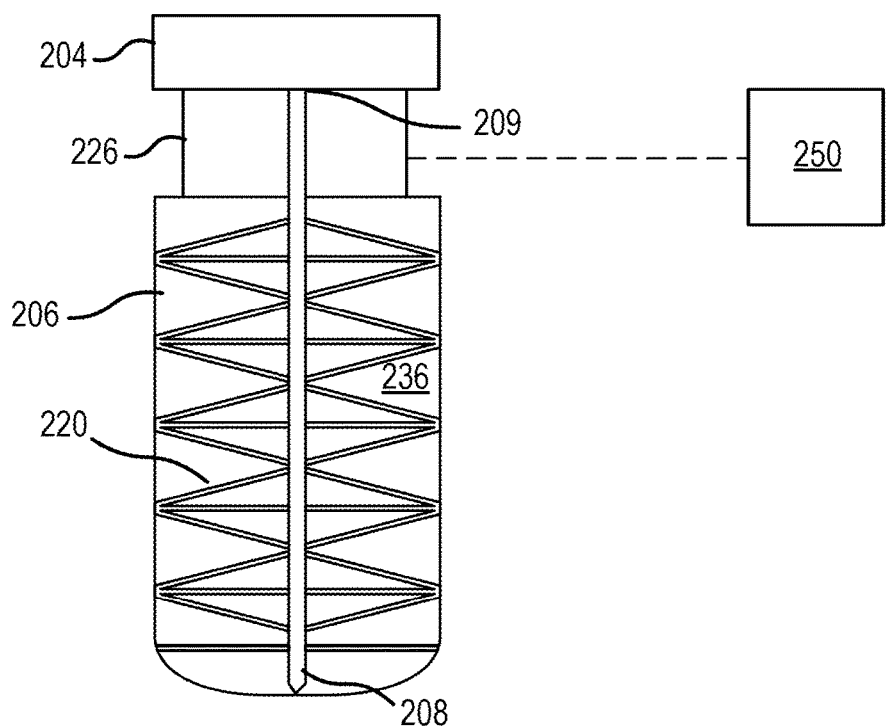
FIG. 6 is a schematic illustration of a self-cleaning needle extending through an electronically activated presser foot, in accordance with various embodiments.

Having described presser foot 206 of FIG. 4B as being passively activated by spring member 240, FIG. 6 illustrates presser foot 206 coupled to body 204 via a linear actuator 226, in accordance with various embodiments. In this regard, presser foot 206 may be actively activated with a linear actuator 226 to move presser foot 206 between the extended position and the retracted position to apply pressure to a fibrous preform during a through thickness reinforcement process. Actuator 226 may be activated to translate presser foot 206 between the extended and retracted positions to clean needle 208. As the actuator 226 translates presser foot 206 between the extended and retracted positions, the needle cleaning material slidingly engages (contacts) needle 208 to clean resin and/or other debris therefrom.

In various embodiments, a control unit 250 is provided, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 250 controls, at least various parts of, and operation of various components of, the end effector 202 (see FIG. 4A). For example, the control unit 250 may control a position of end effector 202 with respect to the fibrous preform, the position of presser foot 206 (e.g., via actuator 226), the position of needle 208 (e.g., via actuator 124a (see FIG. 3)), and/or may receive feedback from one or more sensors.

In various embodiments, presser foot 206 may be fixed to the base 209 of needle 208 via linear actuator 226. The needle 208 may be disposed in the cavity 236 of presser foot 206. During a through thickness reinforcement process, presser foot 206 may contact the fibrous preform (e.g., before the needle 208 contacts the fibrous preform). The control unit 250 may be programmed to retract presser foot 208 to allow the needle 208 to penetrate and transport through the fibrous preform. Then, when the needle 208 lifts up from the fibrous preform, the control unit 250 may be programmed to translate presser foot 208 down and cover the needle 208 (thus, translating the needle cleaning material 220 across the exterior surface (e.g., the outside diameter) of the needle 208). The translating action of the needle 208 and the presser foot 206 (both before and after punching into the fibrous preform fabric) may allow the needle cleaning material 220 to clear resin away from the barbs of the needle 208. Control via linear actuator 226 may tend to provide a more rigid system than one controlled by springs or other similar mechanisms.

Figure 7:
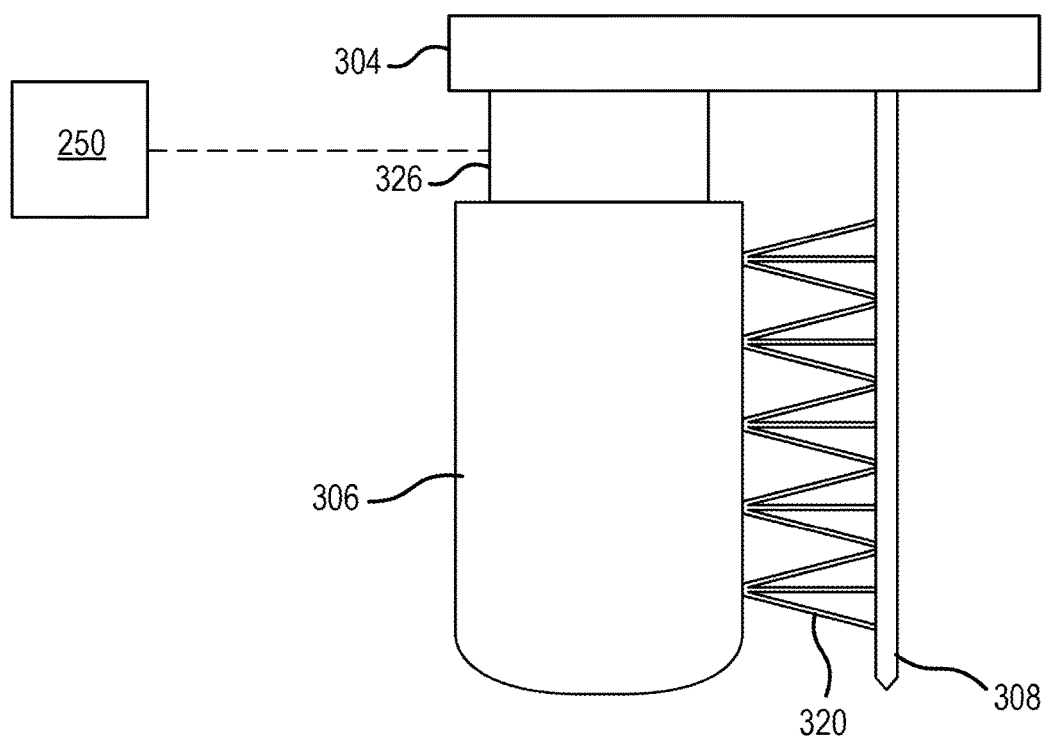
FIG. 7 is a schematic illustration of a self-cleaning needle disposed adjacent to an electronically activated presser foot, in accordance with various embodiments.

Having described presser foot 306 of FIG. 5B as being passively activated by spring member 340, FIG. 7 illustrates presser foot 306 coupled to body 304 via a linear actuator 326, in accordance with various embodiments. In this regard, presser foot 306 may be activated with linear actuator 326 to move presser foot 306 between the extended position and the retracted position to apply pressure to a fibrous preform during a through thickness reinforcement process. Actuator 326 may be activated to translate presser foot 306 between the extended and retracted positions to clean needle 308. As the actuator 326 translates presser foot 306 between the extended and retracted positions, the needle cleaning material slidingly engages (contacts) needle 308 to clean resin and/or other debris therefrom.

In various embodiments, the needle cleaning material 320 may be a separately actuated component that is programmed (e.g., using control unit 250) to translate up and down the needle 308 in between fabric punches. This needle cleaning material 320 may be attached to adjacent presser foot 306. The purpose of the presser foot 306 is, in various embodiments, to conform and compact the surface of the composite preform, which the neighboring needles penetrate the fabric. However, presser foot 306 may be a separately actuated member for the purposes of cleaning needle 308. Additionally, the needle cleaning material 320 could be attached to other linearly translating components such as a roller, a tensioner, etc.

Figure 8:
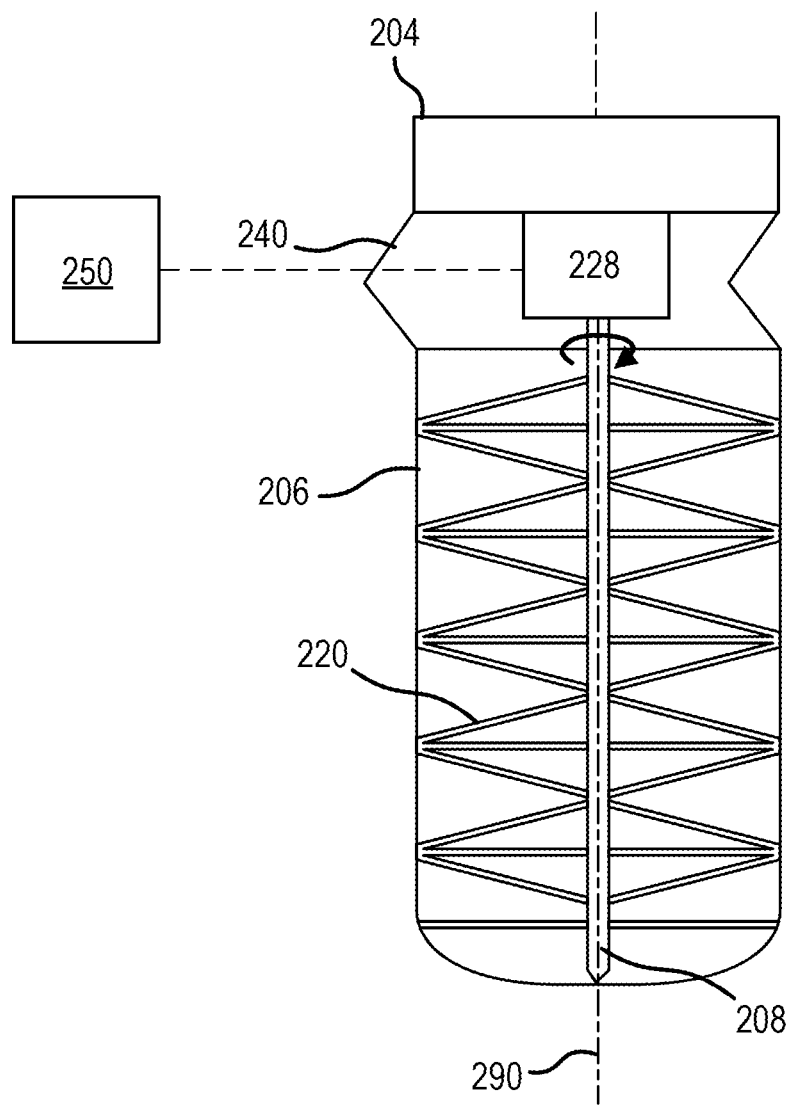
FIG. 8 is a schematic illustration of a self-cleaning needle configured to rotate with respect to a presser foot, in accordance with various embodiments.

FIG. 8 is a schematic illustration of self-cleaning needle 208 configured to rotate about central axis 290 with respect to needle cleaning material 220. Needle 208 may be mounted to body 204 via a rotary apparatus 228, such as a rotary actuator and/or an electric motor. configured to rotate needle 208 with respect to needle cleaning material 220. In this regard, control unit 250 may be configured to activate rotary apparatus 228 to rotate needle 208 to clean the outside surface of needle 208 during or between through thickness reinforcement processes. Although illustrated with spring member 240, rotary apparatus 228 may also be used to rotate a needle 208 in connection with an electrically activated presser foot 206 (e.g., presser foot 206 of FIG. 6 and/or presser foot 306 of FIG. 7). Moreover, rotary apparatus 228 may also be used to rotate a needle 208 located adjacent a presser foot 206 (e.g., presser foot 306 of FIG. 5B or presser foot 306 of FIG. 7).

Figure 9:
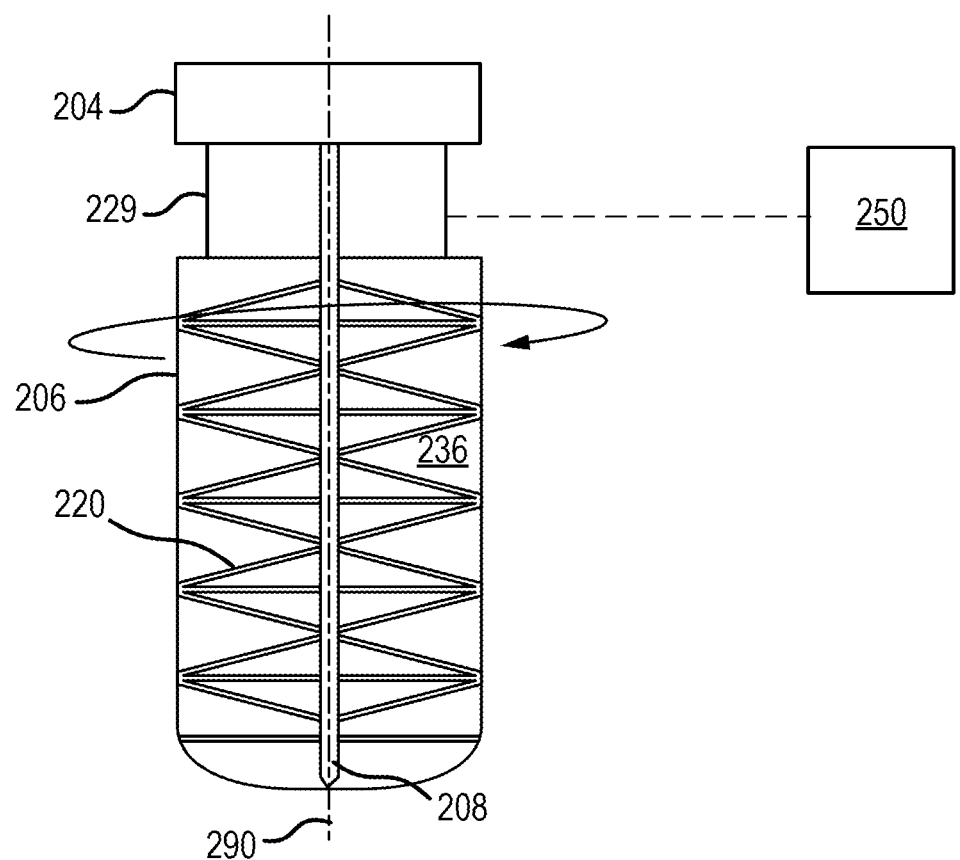
FIG. 9 is a schematic illustration of a self-cleaning needle and a presser foot configured to rotate with respect to the needle, in accordance with various embodiments.

FIG. 9 is a schematic illustration of a self-cleaning needle 208 and a presser foot 206 having needle cleaning material 220 configured to rotate about central axis 290 with respect to needle 208. Presser foot 206 may be mounted to body 204 via a rotary apparatus 229, such as a rotary actuator and/or an electric motor, configured to presser foot 206 with respect to needle 208. As the presser foot 206 and needle cleaning material 220 rotate together about central axis 290 with respect to needle 208, the needle cleaning material 220 slidingly engages the outer surface of the needle 208 to clean resin and/or debris therefrom. In this regard, control unit 250 may be configured to activate rotary apparatus 229 to rotate presser foot 206 and needle cleaning material 220 to clean the outside surface of needle 208 during or between through thickness reinforcement processes. It should be understood that rotary apparatus 229 may also be used to rotate presser foot 206 as described with respect to FIG. 4B and/or FIG. 6 and may also be used to rotate presser foot 306 as described with respect to FIG. 5B and/or FIG. 7.

Figure 10:
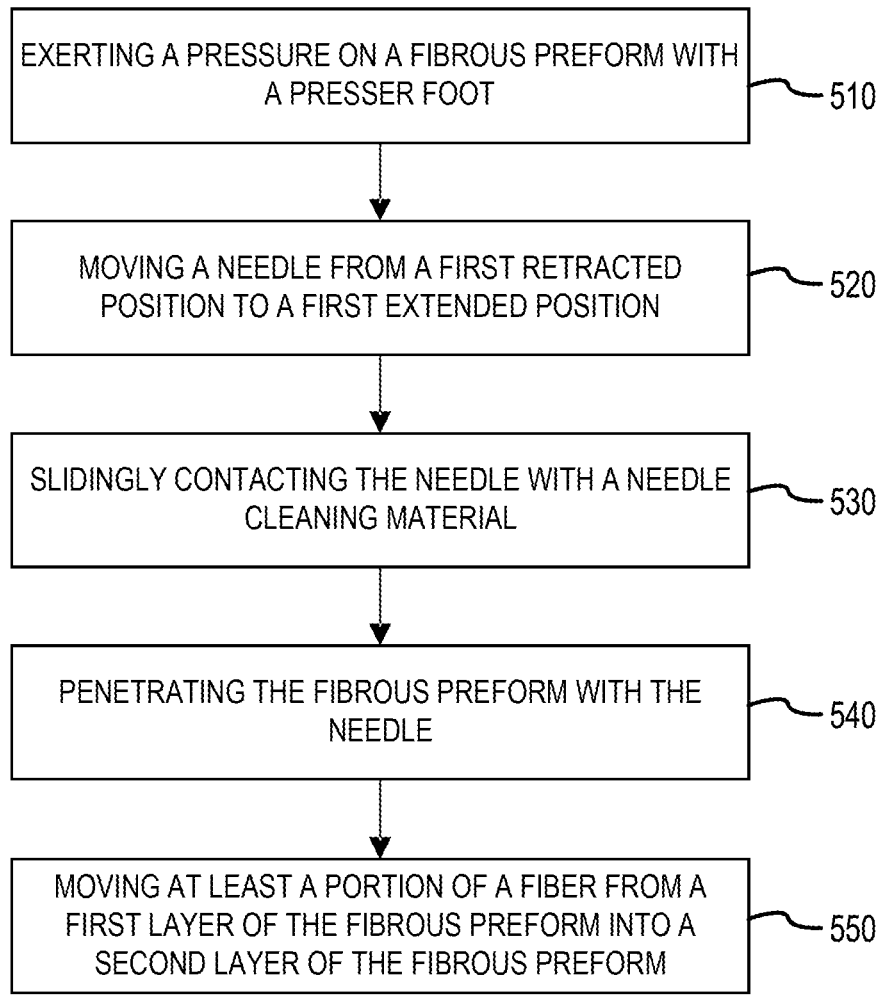
FIG. 10 is a flow chart of a method for performing a through thickness reinforcement process on a fibrous preform, in accordance with various embodiments.

With reference to FIG. 10, a flow diagram of a method 500 for performing a through thickness reinforcement process on a fibrous preform is provided, in accordance with various embodiments. For ease of description, the method 500 is described below with reference to FIG. 3, 4B. The method 500 of the present disclosure, however, is not limited to use of the exemplary end effector 102, 202 of FIG. 3, 4B.

Step 510 may include exerting a pressure on fibrous preform 110 with a presser foot 106. The pressure may be exerted by moving end effector 102 toward fibrous preform. The pressure may be exerted by extending presser foot 106 toward fibrous preform. The pressure may be tailored using a biasing member (e.g., see spring member 240).

Step 520 may include moving needle 108a from a first retracted position to a first extended position (e.g., see FIG. 3). Step 520 may be performed using actuator 124a and control unit 250.

Step 530 may include slidingly contacting the needle 208 with a needle cleaning material 220 in response to the needle 208 moving from the first retracted position to the first extended position.

Step 540 may include penetrating the fibrous preform 110 with the needle 108a in response to the needle 108a moving from the first retracted position to the first extended position.

Step 550 may include moving at least a portion of a fiber 113 from a first layer 112 of the fibrous preform 110 into a second layer 114 of the fibrous preform 110 in response to the needle 108a penetrating the fibrous preform 110. In various embodiments, as is understood by those skilled in the art, step 550 may include pulling a fiber filament through the fibrous preform 110 in a stitching or tufting operation.

In various embodiments, method 500 may further include moving presser foot 206 with respect to needle 208 between a second extended position and a second retracted position. The needle 208 may slidingly contact with the needle cleaning material 220 in response to the presser foot 206 moving between the second extended position to the second retracted position.

Once the needle cleaning material 220 is full of cleared away resin, the needle cleaning material 220 may be replaced or cleaned. In various embodiments, a separate needle cleaning material (e.g., bristle brushes) may be actuated across the needle cleaning material 220 in order to clean out the resin that is filling the needle cleaning material 220. Cleaning could be purely mechanical or may include a solvent. Needle cleaning material cleaners could be implemented in any of the aforementioned embodiments. This may ensure that the self-cleaning system remains functional throughout through thickness reinforcement operations.

Figure 11A:
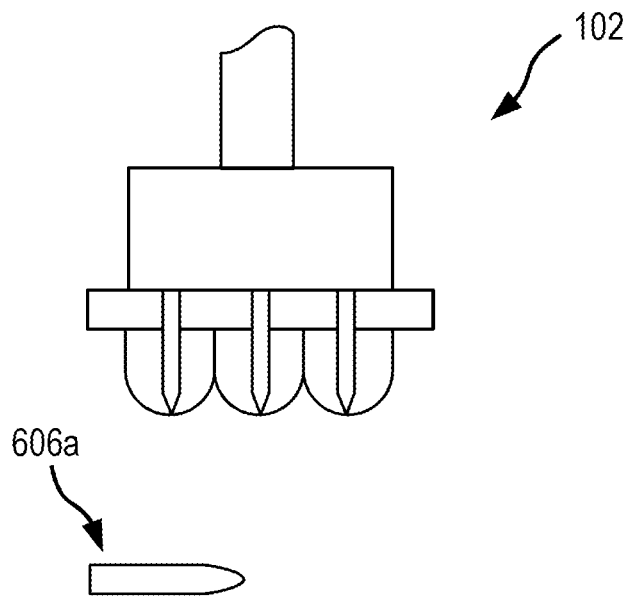
FIG. 11A and FIG. 11B are schematic illustrations of a robotic end effector discarding used presser feet and picking up new presser feet, respectively, in accordance with various embodiments.
Figure 11B:
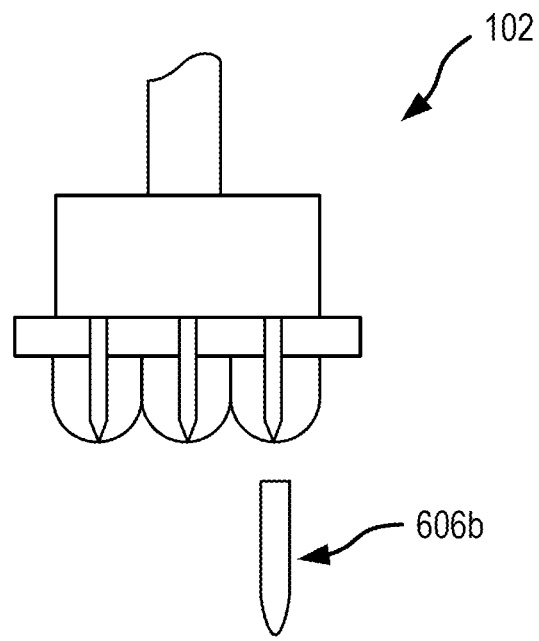

In various embodiments, once the needle cleaning material 220 is full of cleared away resin, the needle cleaning material 220 may be replaced. The programmable robotic needling head (e.g., end effector 102) may be programmed using control unit 250 to discard and pick up new presser feet 106. FIG. 11A and FIG. 11B illustrates end effector 102 having discarded a used or dirty presser foot 606a and picking up a new presser foot 606b, respectively. After a predetermined number of punches, the end effector 102 may be programmed to discard the used presser foot 606a in a pre-determined area. The presser foot 606a may be attached to the end effector 102 via an actuated latch, a clamp, or similar. In this regard, the end effector 102 may be programmed to discard the used presser foot 606a in a pre-determined area by actuating the attaching latch. The end effector 102 may pick up a new presser foot 606b via a similar actuation mechanism. This tends to ensure that the self-cleaning system remains functional throughout through thickness reinforcement operations. The process of discarding a used presser foot 606a and picking up a new presser foot 606b may be automated, in accordance with various embodiments.

Figures 12A, 12B:
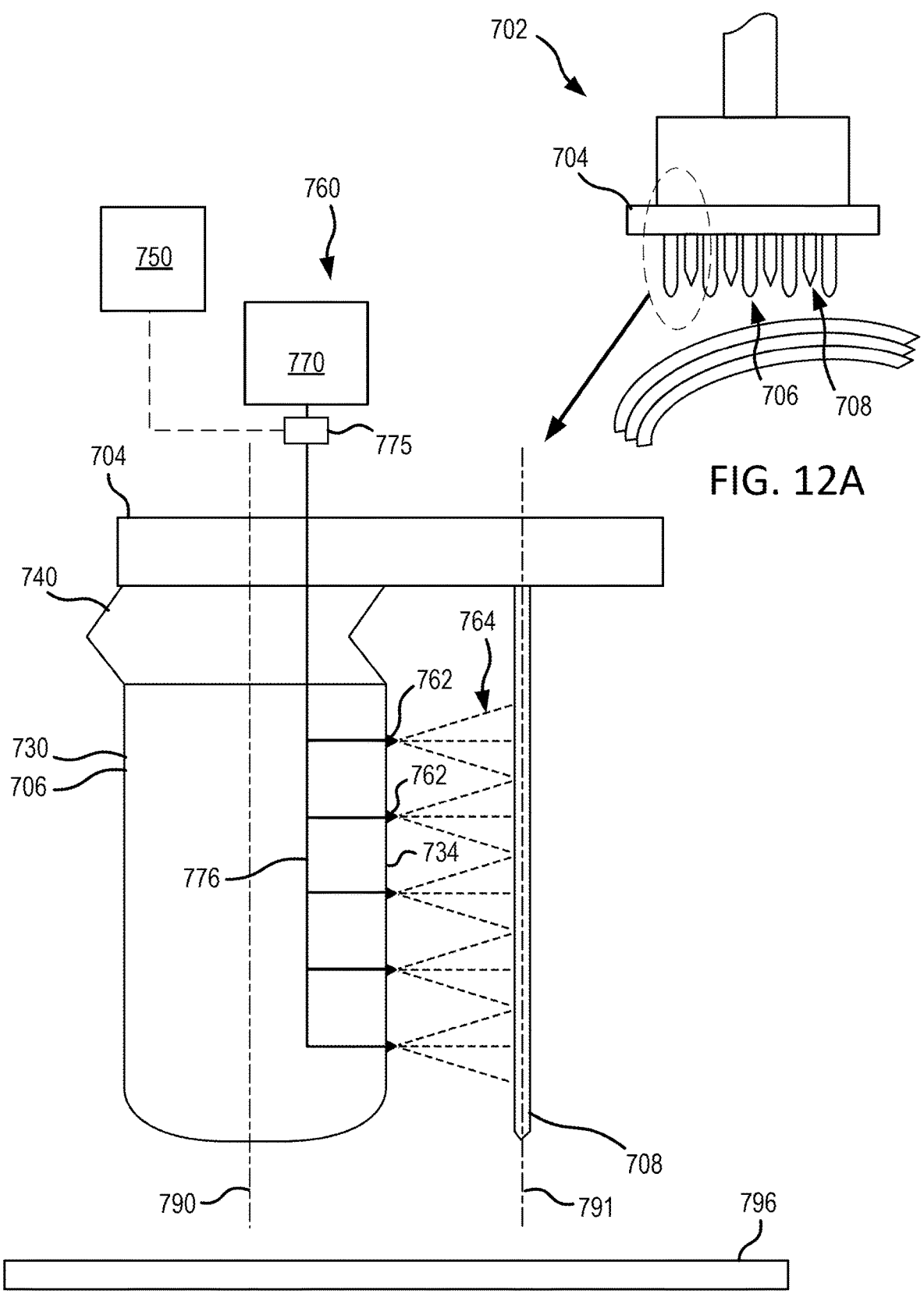
FIG. 12A is a schematic illustration of an end effector having self-cleaning needles disposed adjacent to presser feet, in accordance with various embodiments.
FIG. 12B is a detailed schematic illustration of a self-cleaning needle of the end effector of FIG. 12A with a needle cleaning spray system, in accordance with various embodiments.

In various embodiments, end effector needles of the present disclosure may be cleaned using a high pressure fluid spray. With reference to FIG. 12A and FIG. 12B, a high pressure fluid spray system 760 for an end effector 702 comprising a plurality of self-cleaning needles 708 is schematically illustrated, in accordance with various embodiments. End effector 702 may be similar to end effector 302 of FIG. 5A and FIG. 5B, in accordance with various embodiments; though it should be understood that the fluid spray system 760 can be utilized with any of the end effectors disclosed herein without departing from the scope of the present disclosure. End effector 702 comprises a head or body 704, presser feet 706, and needles 708.

FIG. 12B is an enlarged, schematic illustration of the high pressure spray system 760 coupled with a presser foot 706. Presser foot 706 can be coupled to body 704. A needle 708 can be coupled to body 704. Presser foot 706 may comprise a generally cylindrical body 730 comprising an exterior surface 734. In various embodiments, needle 708 is disposed adjacent to presser foot 706. Presser foot 706 may be coupled to body 704 via a spring member 740. Presser foot 706 may define a central axis 790. Needle 708 may define a central axis 791.

High pressure spray system 760 can include a plurality of spray nozzles 762 coupled to presser foot 706 (e.g., coupled to exterior surface 734) and configured to direct a flow of high pressure fluid 764 toward needle 708. Spray nozzles 762 may be configured to direct the flow of high pressure fluid 764 from within presser foot 706, out of the presser foot 706 via the spray nozzle 762, and away from the presser foot 706 toward needle 708. In this regard, each spray nozzle 762 may be pointed toward the central axis 791. In various embodiments, the fluid 764 is a liquid solvent. In various embodiments, the fluid 764 is a gas. In various embodiments, the fluid 764 is a liquid solvent/gas mixture.

In various embodiments, spray nozzles 762 are fluidly coupled to one or more fluid feeds 770 for supplying a cleaning fluid to the needle 708. A supply line 776 may extend between the fluid feed 770 and the spray nozzles 762 for directing the cleaning fluid from fluid feed 770 to spray nozzles 762. Supply line 776 may extend at least partially through the body 730 of presser foot 706. Supply line 776 may comprise a single inlet for receiving the cleaning fluid from fluid feed 770 and may branch into a plurality of outlets, each coupled to a respective spray nozzle 762. As described with respect to FIG. 15A and FIG. 15B herein, fluid feed 770 may comprise one or more fluid feeds for supplying different cleaning fluids to a common nozzle (i.e., a single nozzle can be fluidly coupled to a plurality of fluid feeds), or for supplying different cleaning fluids to dedicated nozzles (i.e., each nozzle is fluidly coupled to a dedicated fluid feed).

In various embodiments, a control unit 750 is provided, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 750 controls, at least various parts of, and operation of various components of, the high pressure spray system 760. For example, the control unit 750 may control a position of a valve 752 for selectively supplying the spray nozzles 762 with a cleaning fluid.

In various embodiments, the cleaning fluid 764 may be configured to contact needle 708 to clean resin from the needle 708 during and/or between through thickness reinforcement processes. In various embodiments, end effector 702 may be moved over a drip tray 796 during the needle cleaning process to contain or catch cleaning fluid 764 and/or debris from the needle 708. In various embodiments, the cleaning fluid 764 cleans only a portion of needle 708

(e.g., one fourth or one half of a circumference) and other adjacent spray nozzles (similarly situated adjacent to needle 708) clean the other portion(s) of needle 708.

Figures 13A, 13B:
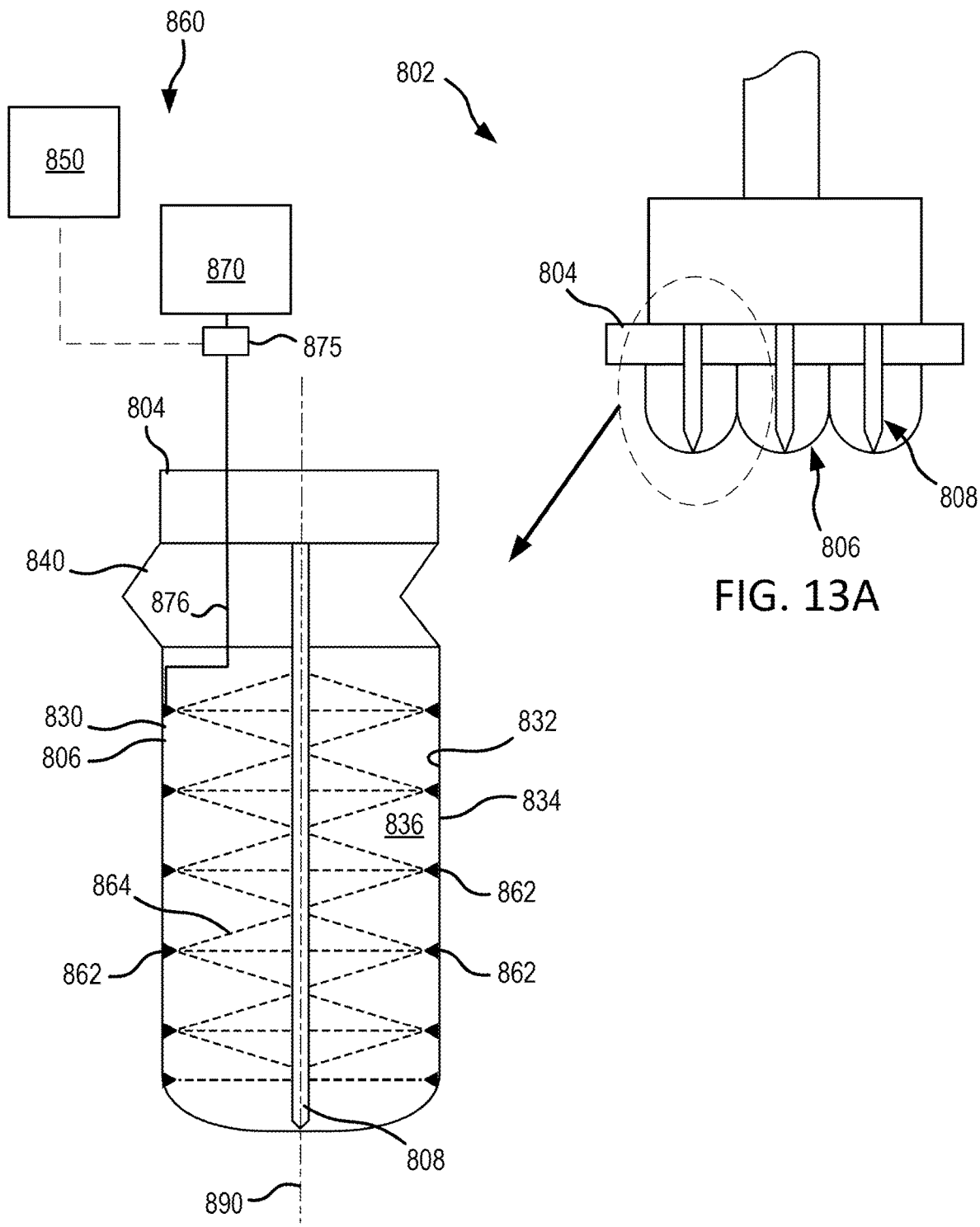
FIG. 13A is a schematic illustration of an end effector having self-cleaning needles that extend through presser feet, in accordance with various embodiments.
FIG. 13B is a detailed schematic illustration of a self-cleaning needle of the end effector of FIG. 13A with a needle cleaning spray system, in accordance with various embodiments.

With reference to FIG. 13A and FIG. 13B, a high pressure fluid spray system 860 for an end effector 802 comprising a plurality of self-cleaning needles 808, each needle 808 extending through a presser foot 806, is schematically illustrated, in accordance with various embodiments. End effector 802 may be similar to end effector 202 of FIG. 4A and FIG. 4B, in accordance with various embodiments; though it should be understood that the fluid spray system 860 can be utilized with any of the end effectors disclosed herein without departing from the scope of the present disclosure.

End effector 802 may comprise a head or body 804, presser feet 806, and needles 808. Presser foot 806 may comprise a generally cylindrical body 830 comprising an interior surface 832 defining a cavity 836 and an exterior surface 834. In various embodiments, needle 808 extends through presser foot 806. In various embodiments, needle 808 and presser foot 806 are coaxially aligned along central axis 890. Presser foot 806 may be coupled to body 804 via a spring member 840.

High pressure spray system 860 can include a plurality of spray nozzles 862 coupled to presser foot 806 (e.g., coupled to interior surface 832) and configured to direct a flow of high pressure fluid 864 toward needle 808. Spray nozzles 862 may be configured to direct the flow of high pressure fluid 864 from interior surface 832 toward central axis 890 and to needle 808. In various embodiments, the fluid 864 is a liquid solvent. In various embodiments, the fluid 864 is a gas. In various embodiments, the fluid 864 is a liquid solvent/gas mixture.

In various embodiments, spray nozzles 862 are fluidly coupled to one or more fluid feeds 870 for supplying a cleaning fluid to the needle 808. A supply line 876 may extend between the fluid feed 870 and the spray nozzles 862 for directing the cleaning fluid from fluid feed 870 to spray nozzles 862. Supply line 876 may extend at least partially through the body 830 of presser foot 806. Supply line 876 may extend at least partially through spring member 840. Supply line 876 may comprise a single inlet for receiving the cleaning fluid from fluid feed 870 and may branch into a plurality of outlets, each coupled to a respective spray nozzle 862. As described with respect to FIG. 15A and FIG. 15B herein, fluid feed 870 may comprise one or more fluid feeds for supplying different cleaning fluids to a common nozzle (i.e., a single nozzle can be fluidly coupled to a plurality of fluid feeds), or for supplying different cleaning fluids to dedicated nozzles (i.e., each nozzle is fluidly coupled to a dedicated fluid feed).

In various embodiments, a control unit 850 is provided, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 750 controls, at least various parts of, and operation of various components of, the high pressure spray system 860. For example, the control unit 850 may control a position of a valve 852 for selectively supplying the spray nozzles 862 with a cleaning fluid.

In various embodiments, the high pressure cleaning fluid 864 may be configured to contact needle 808 to clean resin from the needle 808 during and/or between through thickness reinforcement processes. In various embodiments, end effector 802 may be moved over a drip tray 896 during the needle cleaning process to contain or catch cleaning fluid 864 and/or debris from the needle 808. In various embodiments, the needle 808 remains stationary with respect to spray nozzles 862 during the spray cleaning process. In various embodiments, the needle 808 spins (see description of FIG. 8) about axis 890 with respect to spray nozzles 862 during the spray cleaning process to facilitate cleaning. In various embodiments, the presser foot 806 and spray nozzles 862 spin (see description of FIG. 9) about axis 890 with respect to needle 808 during the spray cleaning process. In various embodiments, needle 808 moves axially with respect to presser foot and spray nozzles 862 during the spray cleaning process to facilitate cleaning. In various embodiments, the spray nozzles 862 are disposed perimetrically (e.g., circumferentially) about the interior surface 832 of presser foot 806 for cleaning all sides of the needle 808. In various embodiments, the spray nozzles 862 are disposed axially (e.g., along axis 890) about the interior surface 832 of presser foot 806 for cleaning along the length of the needle 808. In various embodiments, spray nozzles 862 are disposed at a single axial location and the needle 808 is moved axially with respect to the presser foot 806 and the spray nozzles 862 during the spray process for cleaning along the length thereof.

Figure 14A:
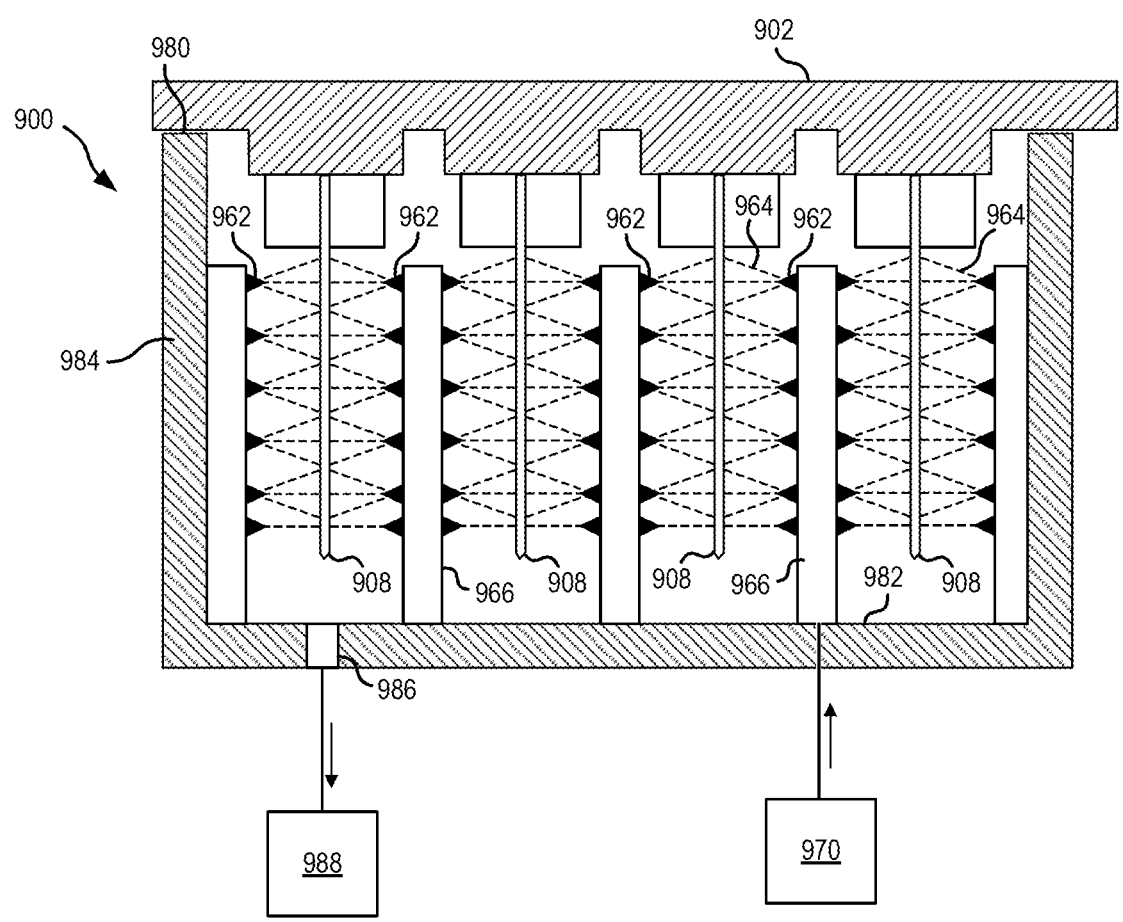
FIG. 14A is a schematic illustration of a needle spray cleaning station during a spray cleaning process, in accordance with various embodiments.

With reference to FIG. 14A a high pressure spray cleaning station 900 during a cleaning process of an end effector 902 having a plurality of needles 908 is schematically illustrated, in accordance with various embodiments. Needle cleaning station 900 may be provided such that the needles 908 have a sealed spray station that the robotic arm (see FIG. 1) periodically visits to remove any contaminates that may be clogging the needle barbs. The robotic arm may move the needles 908 of end effector 902 into the spray cleaning station 900. End effector 902 may seal against the cleaning station 900 at sealing surface 980. The cleaning station 900 can then be configured to spray high pressure fluid at the needles 908 to remove debris. Spray nozzles 962 may be provided for directing the cleaning fluid 964 toward the respective needle 908. In various embodiments, spray nozzles 962 are configured to direct the cleaning fluid in a lateral direction with respect to a center axis of the needles 908. Spray nozzles 962 can be coupled to respective nozzle supply supports 966. The nozzle supply supports 966 can extend from a bottom surface 982 of the cleaning station housing 984. Nozzle supply supports 966 may comprise any suitable support structure configured to supply the spray nozzles 962 with the cleaning fluid 964. In various embodiments, each nozzle supply support 966 surrounds a respective needle 908. In various embodiments, a plurality of nozzle supply supports 966 collectively surround a respective needle 908. In various embodiments, nozzle supply supports 966 define a plenum configured to receive the cleaning fluid 964 from a fluid feed 970. Fluid feed 970 can be located externally from housing 984.

One or more negative pressure drains 986 may be disposed through bottom surface 982 for collecting cleaning fluid and debris contained in the cleaning station 900. In various embodiments, where a solvent and/or debris emits vapors, the negative pressure drain 986 may be configured to contain said vapors in the cleaning station 900. A waste collection and vacuum pump system 988 can be fluidly coupled to drain 986 and configured to apply negative pressure to drain 986 for collecting the fluid and/or debris.

Figure 14B:
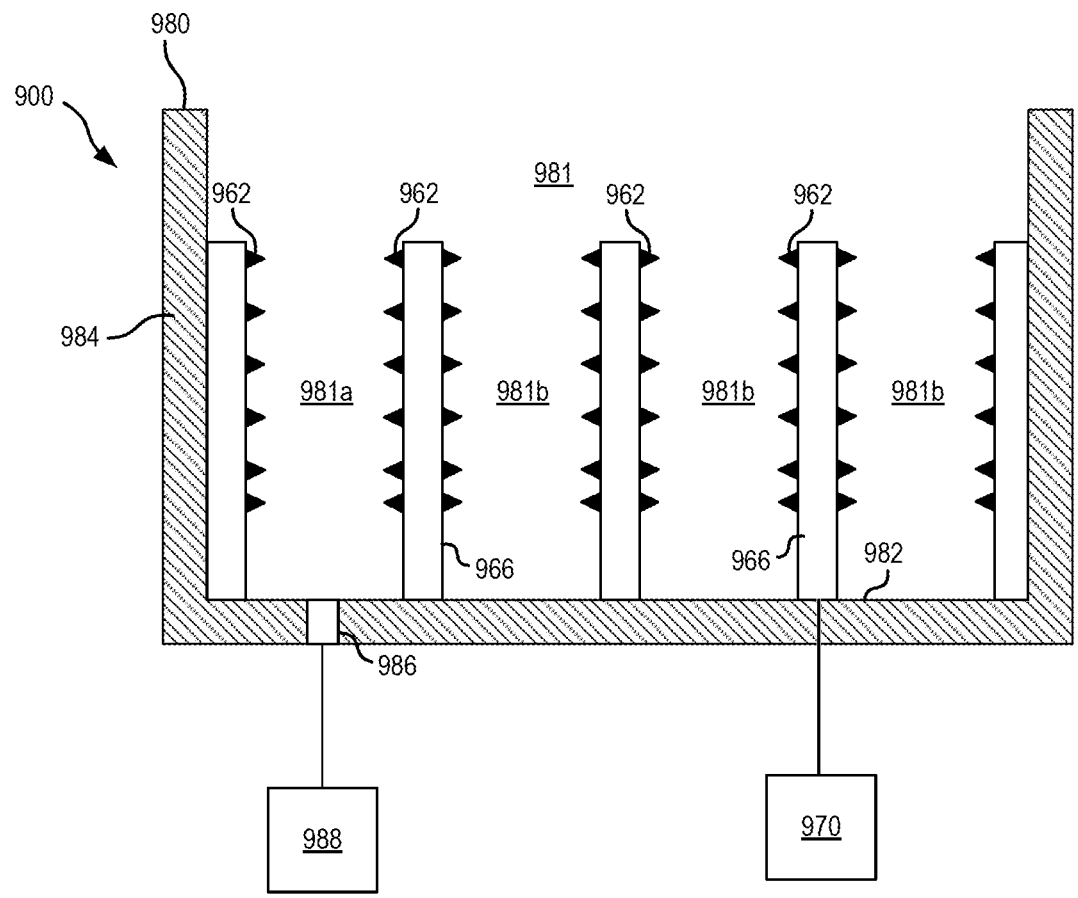
FIG. 14B is a schematic illustration of a needle spray cleaning station, in accordance with various embodiments.

With reference to FIG. 14B the high pressure spray cleaning station 900 is schematically illustrated with the end effector 902 and plurality of needles 908 removed therefrom and the spray nozzles 962 turned off, in accordance with various embodiments. Housing 984 can define a cavity 981 for receiving the plurality of needles 908 (see FIG. 14A). The nozzle supply supports 966 may further divide the cavity 981 into sub-cavities (e.g., see sub-cavity 981*a*, sub-cavity 981*b*, sub-cavity 981*c*, and sub-cavity 981*d*). Each sub-cavity can be configured to receive a needle for cleaning. In various embodiments, each sub-cavity can be configured to receive a plurality of needles for cleaning.

Figures 15A, 15B:
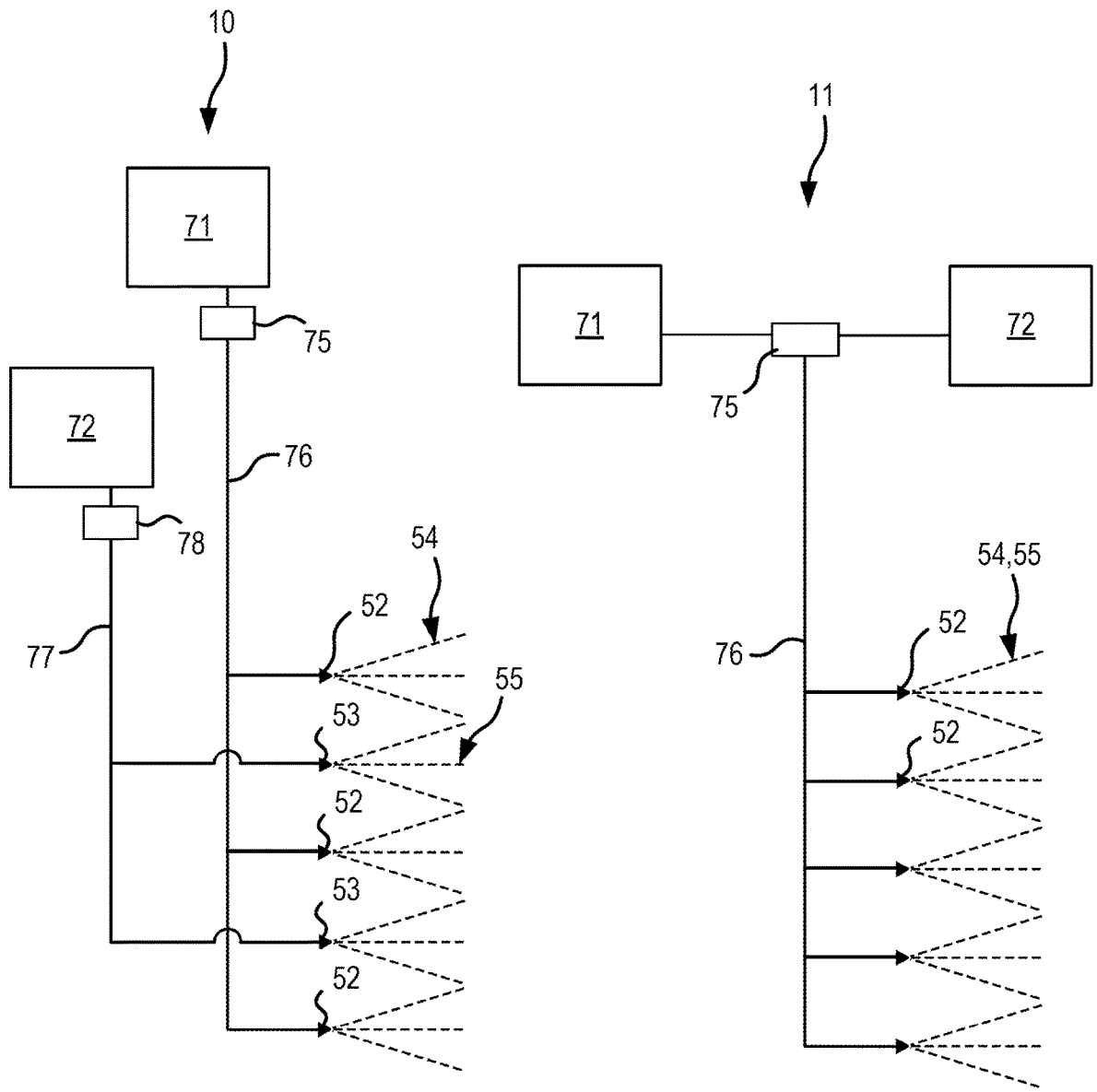
FIG. 15A is a schematic illustration of a cleaning fluid supply system for a needle spray cleaning system, in accordance with various embodiments.
FIG. 15B is a schematic illustration of a cleaning fluid supply system for a needle spray cleaning system, in accordance with various embodiments.

With reference to FIG. 15A, a cleaning fluid supply system 10 is schematically illustrated, in accordance with various embodiments. Cleaning fluid supply system 10 comprises a first plurality of spray nozzles 52 and a second plurality of spray nozzles 53. The first plurality of spray nozzles 52 are fluidly coupled to a first fluid feed 71 via a first supply line 76. A first valve 75 is provided for metering a flow of cleaning fluid from the first fluid feed 71 to the first plurality of spray nozzles 52. The second plurality of spray nozzles 53 are fluidly coupled to a second fluid feed 72 via a second supply line 77. A second valve 78 is provided for metering a flow of cleaning fluid from the second fluid feed 72 to the second plurality of spray nozzles 53. First valve 75 and second valve 78 can be independently controlled (e.g., using a controller such as controller 750 of FIG. 12B and/or controller 850 of FIG. 13B) for supplying the first cleaning fluid 54 and the second cleaning fluid 55, respectively, to a needle for cleaning. In various embodiments, the first cleaning fluid 54 is different from the second cleaning fluid 55. For example, first cleaning fluid 54 is a liquid solvent and second cleaning fluid 55 is a gas (e.g., air, nitrogen, etc.). In this manner, cleaning fluid supply system 10 can clean a needle with a first cleaning fluid at a first time (e.g., a liquid) and subsequently clean said needle with a second cleaning fluid at a second time (e.g., a gas to further clean and dry off the needle and surrounding structure). It should be understood that cleaning fluid supply system 10 can be implemented with any of the spray cleaning systems of the present disclosure without departing from the scope of the present disclosure.

With reference to FIG. 15B, a cleaning fluid supply system 11 is schematically illustrated, in accordance with various embodiments. Cleaning fluid supply system 11 comprises a plurality of spray nozzles 52. The plurality of spray nozzles 52 are fluidly coupled to a first fluid feed 71 via a supply line 76 and a valve 75. The plurality of spray nozzles 52 are also fluidly coupled to a second fluid feed 72 via supply line 76 and valve 75. Valve 75 is provided for metering a flow of cleaning fluid from the first fluid feed 71 to the plurality of spray nozzles 52 and/or from the second fluid feed 72 to the plurality of spray nozzles 52. For example, valve 75 can be a mixing valve, a changeover solenoid valve, or the like.

Valve 75 can be controlled (e.g., using a controller such as controller 750 of FIG. 12B and/or controller 850 of FIG. 13B) for supplying a first cleaning fluid 54 from first fluid feed 71 and/or a second cleaning fluid 55 from second fluid feed to a needle for cleaning. In various embodiments, the first cleaning fluid 54 is different from the second cleaning fluid 55. For example, first cleaning fluid 54 is a liquid solvent and second cleaning fluid 55 is a gas (e.g., air, nitrogen, etc.). In this manner, cleaning fluid supply system 10 can clean a needle with a first cleaning fluid 54 at a first time (e.g., a liquid) and subsequently clean said needle with a second cleaning fluid 55 at a second time (e.g., a gas to further clean and dry off the needle and surrounding structure). In this manner, the first cleaning fluid 54 and/or the second cleaning fluid 55 can be directed at the needle using the same spray nozzles 52. Moreover, valve 75 may be configured to mix first cleaning fluid 54 with second cleaning fluid 55 for directing a mixed cleaning fluid to the needle for cleaning. It should be understood that cleaning fluid supply system 11 can be implemented with any of the spray cleaning systems of the present disclosure without departing from the scope of the present disclosure.

Figure 16:
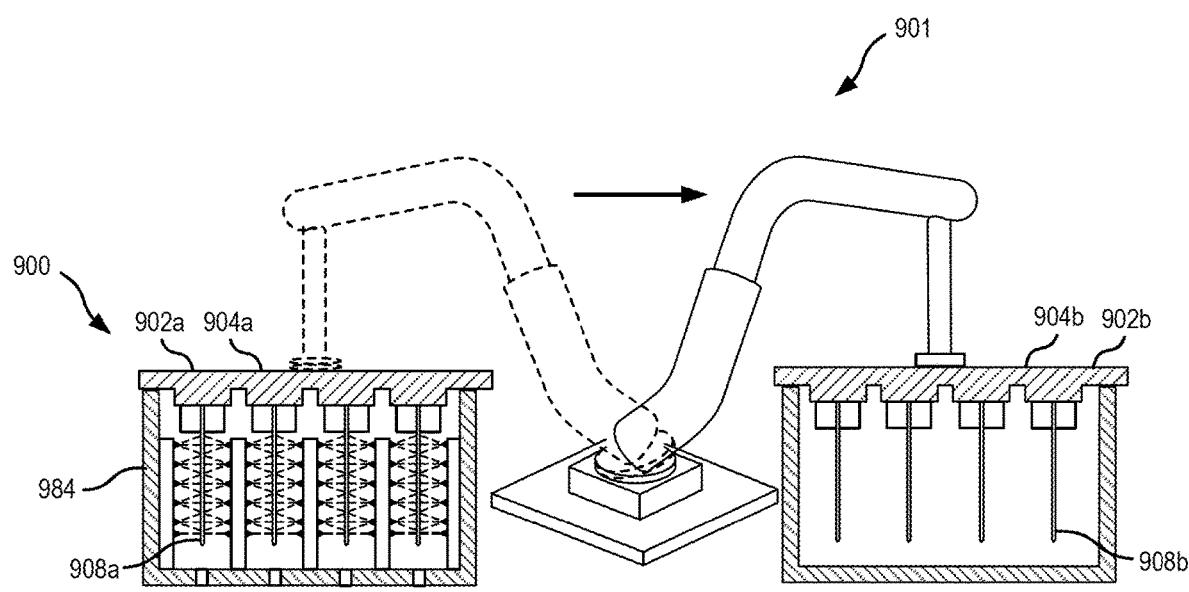
FIG. 16 is a schematic illustration of a robotic arm discarding a used, dirty end effector needling head and picking up clean end effector needling head, in accordance with various embodiments.

In various embodiments, and with reference to FIG. 16, when it is determined that one or more needles 908*a* are dirty and/or are full of debris (e.g., resin), and/or after a predetermined number of punches, the end effector head 904*a* may be replaced. The programmable robotic arm (e.g., robotic arm 901) may be programmed to place a dirty head 904*a* comprising dirty needles 908*a* onto a needle cleaning station, such as needle spray cleaning station 900, and to pick up a clean head 904*b* comprising clean needles 908*b*. In this regard, robotic arm 901 can detach from end effector 902*a*, move to end effector 902*b*, and attach to end effector 902*b* to continue the through thickness reinforcement process with the clean end effector 902*b* while the dirty end effector 902*a* is being cleaned. This tends to ensure that the self-cleaning system remains functional throughout through thickness reinforcement operations. The process of placing the dirty needle head onto the needle cleaning station and picking up a new needle head may be automated, in accordance with various embodiments.

Systems and methods of the present disclosure include a tool for producing composite preforms with tailored in-plane and interlaminar properties. Systems and methods of the present disclosure enable the ability to needle on a complex contour preform. Systems and methods of the present disclosure allow for precisely controlling and programing needling location, angle, depth, and areal density. Systems and methods of the present disclosure allow spatially varying the needling parameters to vary interlaminar versus in-plane properties based on the desired application. Systems and methods of the present disclosure enable fabrication of 2.5D complex contour composite preforms for aerospace structures. Systems and methods of the present lend themselves to fully automated fabrication to reduce costs, improve reproducibility, and scale to production rates.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An end effector for the through thickness reinforcement of a fibrous preform, the end effector comprising:
    a body;
    a presser foot mounted to the body and moveable with respect to the body, the presser foot defines a cavity and a central axis;
    a needle mounted to the body and extending at least partially through the cavity of the presser foot; and
    a plurality of spray nozzles mounted to the presser foot and configured to direct a pressurized cleaning fluid inward toward the central axis for cleaning the needle.

2. The end effector of claim 1, wherein the needle extends is configured to extend through the presser foot and the plurality of spray nozzles are oriented to direct the pressurized cleaning fluid toward a portion of the needle located within the cavity of the presser foot.

3. The end effector of claim 2, wherein the plurality of spray nozzles extends from an interior surface of the presser foot.

4. The end effector of claim 1, wherein the needle is configured to rotate while the plurality of spray nozzles direct the pressurized cleaning fluid toward the needle for cleaning the needle.

5. The end effector of claim 1, wherein the presser foot and the plurality of spray nozzles are configured to rotate with respect to the needle while the plurality of spray nozzles direct the pressurized cleaning fluid toward the needle for cleaning the needle.

6. The end effector of claim 1, wherein the needle is configured to translate with respect to the presser foot while the plurality of spray nozzles direct the pressurized cleaning fluid toward the needle for cleaning the needle.

7. The end effector of claim 1, further comprising:
    a first fluid feed;
    a second fluid feed, wherein the plurality of spray nozzles comprises a first plurality of spray nozzles and a second plurality of spray nozzles;
    a first valve coupled between the first fluid feed and the first plurality of spray nozzles; and
    a second valve coupled between the second fluid feed and the second plurality of spray nozzles;
    wherein the first fluid feed is configured to supply the first plurality of spray nozzles with a first cleaning fluid via the first valve and the second fluid feed is configured to supply the second plurality of spray nozzles with a second cleaning fluid via the second valve.

8. The end effector of claim 1, further comprising:
    a first fluid feed;
    a second fluid feed; and
    a valve configured to meter at least one of:
        a flow of a first cleaning fluid from the first fluid feed to the plurality of spray nozzles; and
        a flow of a second cleaning fluid from the second fluid feed to the plurality of spray nozzles.

9. The end effector of claim 1, wherein the presser foot is coupled to the body via a spring member.

10. The end effector of claim 1, wherein the pressurized cleaning fluid includes a liquid solvent.

11. A method for cleaning a needle operatively coupled to an end effector for the through thickness reinforcement of a fibrous preform, the end effector includes a body, a presser foot mounted to the body and moveable with respect to the body, the presser foot defining a cavity and a central axis, the needle is mounted to the body and extends at least partially through the cavity of the presser foot, and a plurality of spray nozzles mounted to the presser foot and configured to direct a pressurized cleaning fluid inward toward the central axis for cleaning the needle, the method comprising:

directing the pressurized cleaning fluid from the plurality of spray nozzles inward toward the central axis and to the needle;
contacting the needle with the pressurized cleaning fluid; and
removing debris from the needle with the needle cleaning fluid.

12. The method of claim 11, further comprising:
performing a through thickness reinforcement process with the first end effector;
moving the first end effector to a needle spray cleaning station, wherein the needle spray cleaning station directs the needle cleaning fluid from the plurality of spray nozzles to the needle to remove the debris from the needle with the needle cleaning fluid;
detaching a robotic arm from the first end effector;
moving the robotic arm to a clean second end effector;
attaching the robotic arm to the clean second end effector; and
continuing the through thickness reinforcement process with the clean second end effector while the first end effector is being cleaned by the needle spray cleaning station.

13. The method of claim 11, wherein directing a cleaning fluid from a plurality of spray nozzles to the needle comprises directing a first cleaning fluid comprising a gas from the plurality of spray nozzles to the needle and subsequently directing a second cleaning fluid comprising a gas from the plurality of spray nozzles to the needle for drying the needle.

14. The method of claim 11, further comprising at least one of:
translating the needle with respect to a presser foot while the needle cleaning fluid is being directed to the needle; or
rotating the needle with respect to the presser foot while the needle cleaning fluid is being directed to the needle.

* * * * *